United States Patent [19]

Elgarhy

[11] Patent Number: 5,660,889
[45] Date of Patent: Aug. 26, 1997

[54] COATING POLYAMIDE OR POLYESTER POROUS SELF-SUPPORTING SHEET

[75] Inventor: Yassin Elgarhy, Laval, Canada

[73] Assignee: Trichromatic Carpet Inc., Canada

[21] Appl. No.: 685,045

[22] Filed: Jul. 23, 1996

Related U.S. Application Data

[60] Division of Ser. No. 465,439, Jun. 5, 1995, Pat. No. 5,574,088, which is a continuation-in-part of Ser. No. 348,715, Dec. 2, 1994, abandoned.

[30] Foreign Application Priority Data

Nov. 24, 1994 [CA] Canada ................................ 2136578

[51] Int. Cl.$^6$ ........................ B05D 3/02; B32B 27/02; D04H 1/08
[52] U.S. Cl. .................... 427/387; 162/108; 162/157.3; 427/322; 442/126; 442/127
[58] Field of Search ........................ 8/115.64; 162/78, 162/87, 107, 108, 111, 157.3, 183; 524/542, 588; 427/387, 322; 428/280, 290

[56] References Cited

U.S. PATENT DOCUMENTS

| | | | |
|---|---|---|---|
| 4,162,190 | 7/1979 | Ashworth | 428/280 |
| 4,208,173 | 6/1980 | Gregorian et al. | 252/307 |
| 4,520,176 | 5/1985 | Martin et al. | 524/263 |
| 4,619,864 | 10/1986 | Hendrix et al. | 428/240 |

OTHER PUBLICATIONS

Chemical abstracts No. 85:7559, Szabolcs et al., "Impregnation of textile material." Feb. 1976.

*Primary Examiner*—Robert E. Sellers
*Attorney, Agent, or Firm*—Bachman & LaPointe, P.C.

[57] ABSTRACT

A composition for increasing the resistance of polyamide fibers or polyester fibers to oxidizing agents comprising an organosiloxane modified with amino groups, melamine formaldehyde resin, a catalyst for complexing the melamine formaldehyde resin and water. The composition is used by applying it to the fibers so the fibers absorb the composition, and then drying and curing the composition on the fibers. The composition is employed to treat a polyester or polyamide felt employed to convey wood pulp which is to be bleached, prior to paper making operations, treatment of the felt with the composition significantly lengthens the useful life of the felt, exposed to bleaching chemicals.

6 Claims, No Drawings

COATING POLYAMIDE OR POLYESTER POROUS SELF-SUPPORTING SHEET

This application is a divisional of U.S. patent application Ser. No. 08/465,439, filed Jun. 5, 1995, now U.S. Pat. No. 5,574,088, which in turn is a Continuation-In-Part of U.S. patent application Ser. No. 08/348,715, filed Dec. 2, 1994, now abandoned.

FIELD OF THE INVENTION

The invention relates to compositions for treating a porous self-supporting support carrier, particularly a support carrier of polyester or polyamide fibers, such as nylon, to increase their resistance to oxidizing agents, such as hydrogen peroxide and sodium hypochlorite, to methods of treating such support carrier using such compositions, to a support carrier treated with the composition, and to an improvement in a process of chemically oxidizing cellulosic fiber material such as wood pulp.

BACKGROUND OF THE INVENTION

Polyamide and polyester fibers have poor resistance to oxidizing agents, particularly to sodium hypochlorite. Polyester fibers and polyamide fibers, including all grades of nylon, lose strength after being in contact with sodium hypochlorite solution for a few hours.

In the manufacture of paper from cellulosic fiber wood pulp, the pulp is subjected to bleaching to increase the whiteness or brightness of the paper subsequently produced from the pulp. In this bleaching operation the pulp is exposed to oxidizing agents such as hydrogen peroxide and sodium hypochlorite and is thereafter conveyed to a papermaking operation. In these procedures the pulp is conveyed on a porous, self-supporting carrier sheet in the form of an elongate, continuous belt, and this carrier sheet, referred to in the paper-making art as a felt, is exposed to the oxidizing or bleaching chemical.

The exposure of the carrier sheet to the oxidizing or bleaching chemical substantially lowers the useful life of the felt.

These felts which typically may be 45 to 135 meters in length, 7 meters wide and 3 to 5 mm thick are expensive typically costing several thousand dollars. The exposure of the felts to the bleaching or oxidizing agents, so degrades the felts that their useful life is not more than 40 days in continuous operation and frequently as short as 20 days. Various solutions have been tried to overcome this problem. One is to treat the felt with chlororesorcinol or chlororesorcinol formaldehyde, or a combination of chlororesorcinol and acid dyes. This improves the resistance of the felt to chlorine to a certain extent, but it does not have a useful effect against hydrogen peroxide. Another solution that has been tried is to apply melamine formaldehyde resin to the felt; however, this treatment makes the felt very stiff.

SUMMARY OF THE INVENTION

It is an object of this invention to provide an improved process for chemically oxidizing or bleaching cellulosic fiber material, such as wood pulp, in which the fiber material is supported on a carrier sheet and the fiber material and carrier sheet are exposed to oxidizing or bleaching chemical.

It is a further object of this invention to provide a method of increasing the resistance of a polyamide fiber or polyester fiber carrier sheet to oxidizing or bleaching agents.

It is a still further object of this invention to provide a porous, self-supporting carrier sheet for use in conveying cellulosic fiber material, such as wood pulp.

It is still another object of this invention to provide a composition for increasing the resistance of polyamide or polyester fibers to oxidizing or bleaching chemical.

In particular a composition is provided for treating polyester and polyamide fibers, such as nylon, in the form of felts, to increase their resistance to oxidizing agents. The composition also renders the fibers soft and prolongs the useful life of felts used in paper-making.

In accordance with one aspect of the invention there is provided in a process of chemically oxidizing cellulosic fiber material in which the fiber material is supported on a porous, self-supporting carrier sheet and the fiber material and the carrier sheet are exposed to a chemical oxidizing agent, and in which the carrier sheet is of a material deleteriously affected by the oxidizing agent, the improvement wherein said carrier sheet is pretreated with a composition which increases the resistance of the material of the carrier sheet to the oxidizing agent, said composition comprising a) an organosiloxane modified with amino groups, b) a melamine formaldehyde resin, c) a catalyst for complexing said melamine formaldehyde resin; and d) water.

In accordance with another aspect of the invention there is provided a porous, self-supporting carrier sheet for use in conveying cellulosic pulp fibers in a paper manufacture, said carrier sheet being formed of polyester or polyamide fibers, said fibers of said sheet having a coating thereon derived from interaction of said fibers with a composition comprising a) an organosiloxane modified with amino groups, b) a melamine formaldehyde resin, c) a catalyst for complexing said melamine formaldehyde resin, and d) water.

In accordance with still another aspect of the invention there is provided a method of increasing the resistance of a polyamide fiber or polyester fiber porous, self-supporting carrier sheet to oxidizing agents comprising the steps of: (a) preparing a composition comprising (i) an organosiloxane modified with amino groups; (ii) a melamine formaldehyde resin; (iii) a catalyst for complexing said melamine formaldehyde resin; and (iv) water; (b) applying said composition to said carrier sheet and (c) drying and curing said composition on the fibers of said carrier sheet.

In accordance with yet another aspect of the invention there is provided a composition for increasing the resistance of polyamide fibers or polyester fibers to oxidizing agents, comprising: (a) an organosiloxane modified with amino groups; (b) a melamine formaldehyde resin; (c) a catalyst for complexing said melamine formaldehyde resin; and (d) water.

DETAILED DESCRIPTION OF THE INVENTION

Compositions according to the invention are prepared by dissolving the melamine formaldehyde resin, the catalyst for complexing the formaldehyde resin in water and dispersing an aqueous emulsion of the organosiloxane in the water. The pH of the composition is preferably adjusted to 7 or less, more preferably to pH 5 to 6.

The preferred melamine formaldehyde resin is methylated methylol melamine formaldehyde. The preferred concentration of melamine formaldehyde resin in the composition is 30–150 g/l.

The organosiloxane modified with amino groups is insoluble in water but can be emulsified in water.

The organosiloxane employed in the invention may be represented by formula (I):

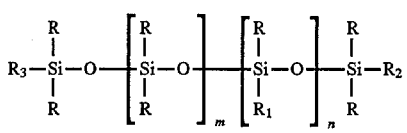

wherein each R, which may be the same or different is lower alkyl of 1 to 4 carbon atoms or phenyl, each $R_1$ is lower alkyl of 1 to 4 carbon atoms, phenyl or is selected from amino and lower alkoxy of 1 to 4 carbon atoms, and $R_2$ and $R_3$, which may be the same or different are each selected from lower alkyl of 2 to 4 carbon atoms, phenyl, lower alkoxy of 1 to 4 carbon atoms or amino, provided that at least one of $R_1$, $R_2$ and $R_3$ comprises amino.

The integers m and n are subject to wide variation and effectively determine the chain length of the organosiloxane. In particular the integers m and n are selected such that the modified organosiloxane is a fluid having a viscosity at 25° C. of 10 to 3500 cs, more especially 500 to 1000 cs, and a specific gravity at 25° C. of 0.95 to 1.05. Suitably the amine content calculated as g/mol.av. is 200 to 3000, preferably 400 to 2000.

One especially preferred class of organosiloxane in the invention is that of formula (II):

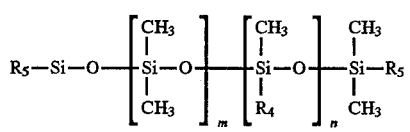

in which each $R_4$ and $R_5$, which may be the same or different is selected from amino and lower alkoxy of 1 to 4 carbon atoms, provided that at least some of the radicals $R_4$ are amino; preferably at least one of the radicals $R_5$ is amino and m and n are as defined previously.

Another preferred class of organosiloxane in the invention is that of formula (III):

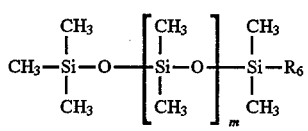

in which $R_6$ is amino and n is as defined previously.

It will be observed that the organosiloxanes of formula (II) may have amino or lower alkoxy modifying groups both as side chain members and as terminal groups of the chain, whereas in formula (III) the modifying amino is a terminal group.

The organosiloxane is preferably employed in the composition of the invention in a concentration of 10–150 g/l. It is employed as an emulsion in water preferably having a solids content of 20 to 50%, by weight.

The catalyst used is one which complexes the melamine formaldehyde. Its preferred concentration is 5–30 g/l of composition. It is preferably one of the following: salts of alkaline-earth metals; aluminum chloride solution; a solution of magnesium chloride and aluminum chloride.

The composition may optionally include a fluorochemical, i.e. a carbon-based polymer containing fluorine. The preferred concentration of fluorochemical in the composition is 5–50 g/l, more preferably 5–25 g/l. The preferred solids content of the fluorochemical is 15–40% by weight.

The composition may optionally include a combination of three acid dyes, namely Acid Yellow, Acid Red and Acid Blue. The Acid Yellow dye is preferably one of the following: Acid Yellow 10, 25, 169 and 219. The Acid Red dye is preferably one of the following: Acid Red 42, 57, 337 and 361. The Acid Blue dye is preferably one of the following: Acid Blue 25, 27, 72, 258, 277 and 294. The preferred concentration of acid dyes in the composition is 0.1–0.2 g/l Acid Yellow, 0.1–0.2 g/l Acid Red and 0.01–0.03 g/l Acid Blue.

The composition can further optionally include an antiprecipitant dispersing agent. Such agent is preferably ethoxylated fatty amine or ethoxylated fatty alcohol. Its preferred concentration in the composition is 1–10 g/l.

In the method of treating the carrier sheet polyester fibers or polyamide fibers, such as nylon felts, the carrier sheet or felt is preferably immersed in a bath of the composition until the carrier sheet or felt is thoroughly wetted. Preferably between 30–200% by weight of the composition is absorbed by the carrier sheet or felt, relative to the weight of the dry carrier sheet or felt. The carrier sheet or felt is then dried and is cured at an elevated temperature, preferably 330°–350° F. Drying and curing times depend on the weight, size and nature of the carrier sheet or felt and on the solution employed.

In one embodiment of the method, an aqueous solution of three acid dyes, Acid Yellow, Acid Red and Acid Blue is prepared. The preferred concentration of the acid dyes is 0.14 g/l Acid Yellow, 0.14 g/l Acid Red and 0.014 g/l Acid Blue. The felt is immersed in this solution, dried, and then immersed in a bath of the composition as described above. The felt is then dried and cured as described above.

The support carrier sheet may be woven or non-woven and is formed from polyester or polyamide fibers, usually polyamide fibers such as nylon.

The support carrier sheet is porous and will permit water to escape therethrough. In some woven support carrier sheets the weave is relatively open so that small openings between adjacent fibers or yarns of the weave are visible to the naked eye.

The carrier sheet or felt is self-supporting by which is to be understood that the sheet or felt is semi-rigid and maintains its generally planar configuration when supported at a single point, without bending or folding. On the other hand, the sheet or felt has sufficient flexibility that it can be manipulated manually, for example, it may be folded on itself, however, on removal of the manipulating force it resumes its original configuration or can be readily manipulated to restore the original configuration.

The sheet or felt is thus quite different in nature from a cloth or textile employed in garment manufacture.

The sheet or felt is relatively incompressible and typically has a length of at least 40 meters, suitably 45 to 135 meters, and a thickness of at least 2 mm, typically 3 to 5 mm.

Especially preferred open weave felts are of polyamide fiber, particularly Nylon 6 and are formed by 15 denier fibers grilion and have a weight of about 1400 gm/m². Finer felts are of 3 to 4 denier fiber and weigh about 1200 g/m².

In general the felts are of 3 to 15 denier fiber and have a weight of 1000 to 1500 g/m².

In the invention amino groups of the modified organosiloxane react with hydroxyl groups of the polyester or polyamide providing a softening effect whereas the melamine formaldehyde resin produces cross-linking which results in rigidity. Amino groups of the polyester or polyamide may be blocked with the acid dyes.

The following examples describe testing of fibers treated with prior art compositions and with compositions according to the invention.

In these examples the organosiloxane employed was of the class of formula (II) hereinbefore having a viscosity at 25° C. of 750 cs, a specific gravity at 25° C. of 0.98 and having a function group equivalent of amino and lower alkoxy groups of 1,900.

EXAMPLE 1

A 15 denier fiber of Nylon 6 was tested for break point and for elongation using an Instron model 1130 (trademark) testing machine. The break point was determined to be 80 g and the elongation 59.7%.

The same fiber was immersed in 3% hydrogen peroxide solution for 75 hours at 175° F., then rinsed, dried and tested as above.

| Result: | |
|---|---|
| BREAK | 71.4 g |
| ELONGATION | 47.5% |
| RETAINED STRENGTH | 89.2% |
| RETAINED ELONGATION | 79.5% |

The same fiber was immersed in a 10% sodium hypochlorite solution for 75 hours at 175° F., then rinsed, dried and tested as above.

| Result: | |
|---|---|
| BREAK | 32.6 g |
| ELONGATION | 22.2% |
| RETAINED STRENGTH | 40.8% |
| RETAINED ELONGATION | 37.2% |

EXAMPLE 2

A fiber as in Example 1 was immersed in a solution containing 15 g/l Mesitol NBS (novolak resin) and 35 g/l chlororesorcinol. The pick-up (weight of solution absorbed to weight of dry fiber) was 50%. The fiber was rinsed and dried. The treated fiber was tested after immersion in hydrogen peroxide solution as in Example 1.

| BREAK | 78.3 g |
|---|---|
| ELONGATION | 52.9% |
| RETAINED STRENGTH | 97.8% |
| RETAINED ELONGATION | 88.6% |

The treated fiber was tested after immersion in sodium hypochlorite solution as in Example 1.

| BREAK | 28 g |
|---|---|
| ELONGATION | 22% |
| RETAINED STRENGTH | 35% |
| RETAINED ELONGATION | 36.8% |

EXAMPLE 3

A fiber as in Example 1 was immersed in a solution containing three acid dyes: 0.14 g/l Acid Yellow, 0.14 g/l Acid Red and 0.014 g/l Acid Blue. The pH was adjusted to 5. The pick-up was 50%. The fiber was then immersed in a second bath as in Example 2. The pick-up was 50%. The fiber was rinsed and dried. The treated fiber was tested after immersion in hydrogen peroxide solution as in Example 1.

| BREAK | 76.8 g |
|---|---|
| ELONGATION | 46% |
| RETAINED STRENGTH | 96% |
| RETAINED ELONGATION | 77% |

The treated fiber was tested after immersion in sodium hypochlorite solution as in Example 1.

| BREAK | 28.7 g |
|---|---|
| ELONGATION | 24.5% |
| RETAINED STRENGTH | 35.8% |
| RETAINED ELONGATION | 41% |

EXAMPLE 4

A fiber as in Example 1 was immersed in a bath containing 15 g/l Mesitol NBS and 35 g/l sulfonated resol resin. The pick-up was 50%. The fiber was dried.

The treated fiber was tested after immersion in hydrogen peroxide solution in accordance with Example 1.

| BREAK | 67.5 g |
|---|---|
| ELONGATION | 38.2% |
| RETAINED STRENGTH | 84.3% |
| RETAINED ELONGATION | 64% |

The treated fiber was tested after immersion in sodium hypochlorite solution in accordance with Example 1.

| BREAK | 34.6 g |
|---|---|
| ELONGATION | 25.9% |
| RETAINED STRENGTH | 43.2% |
| RETAINED ELONGATION | 43.3% |

EXAMPLE 5

A fiber as in Example 1 was treated with the three acid dyes as in Example 3. It was then immersed in a bath containing 15 g/l Mesitol NBS and 35 g/l sulfonated resol resin at pH 5. Pick-up was 50%. The fiber was dried.

The treated fiber was tested after immersion in hydrogen peroxide solution in accordance with Example 1.

| BREAK | 57 g |
|---|---|
| ELONGATION | 34.7% |
| RETAINED STRENGTH | 71.2% |
| RETAINED ELONGATION | 58.1% |

The treated fiber was tested after immersion in sodium hypochlorite solution in accordance with Example 1.

| BREAK | 34 g |
|---|---|
| ELONGATION | 27.5% |
| RETAINED STRENGTH | 42.5% |
| RETAINED ELONGATION | 46% |

EXAMPLE 6

A second sample of 15 denier fiber of Nylon 6 having the same break point and elongation as in Example 1 was tested after immersion in hydrogen peroxide solution as in Example 1.

| BREAK | 72 g |
|---|---|
| ELONGATION | 47% |
| RETAINED STRENGTH | 90% |
| RETAINED ELONGATION | 78.7% |

The fiber was tested after immersion in sodium hypochlorite solution as in Example 1.

| BREAK | 50 g |
|---|---|
| ELONGATION | 32% |
| RETAINED STRENGTH | 62.5% |
| RETAINED ELONGATION | 53.6% |

EXAMPLE 7

A fiber as in Example 6 was immersed in a solution containing 35 g/l chlororesorcinol and 15 g/l sulfonated resol resin at pH 5. The pick-up was 50%. The fiber was dried.

The treated fiber was tested after immersion in hydrogen peroxide solution as in Example 1.

| BREAK | 44 g |
|---|---|
| ELONGATION | 30% |
| RETAINED STRENGTH | 55% |
| RETAINED ELONGATION | 50.2% |

The treated fiber was tested after immersion in sodium hypochlorite solution as in Example 1.

| BREAK | 81.6 g |
|---|---|
| ELONGATION | 60.6% |
| RETAINED STRENGTH | 102% |
| RETAINED ELONGATION | 101.5% |

EXAMPLE 8

A fiber as in Example 6 was immersed in a bath containing 35 g/l chlororesorcinol and 15 g/l sulfonated resol resin. The fiber was dried and then immersed in a bath containing 100 g/l melamine resin, 20 g/l catalyst and 35 g/l fluorochemicals. It was then dried and cured at 350° F. for 90 seconds.

The treated fiber was tested in hydrogen peroxide solution as in Example 1.

| BREAK | 41 g |
|---|---|
| ELONGATION | 28% |
| RETAINED STRENGTH | 51.2% |
| RETAINED ELONGATION | 46.9% |

The treated fiber was tested in sodium hypochlorite solution as in Example 1.

| BREAK | 74.4 g |
|---|---|
| ELONGATION | 56.8% |
| RETAINED STRENGTH | 93% |
| RETAINED ELONGATION | 95.1% |

EXAMPLE 9

A third sample of 15 denier fiber of Nylon 6 having a break point of 75.6 g and an elongation of 72.6% was tested after immersion in hydrogen peroxide solution as in Example 1.

| BREAK | 67.6 g |
|---|---|
| ELONGATION | 63.0% |
| RETAINED STRENGTH | 89.4% |
| RETAINED ELONGATION | 86.7% |

The treated fiber was tested after immersion in sodium hypochlorite solution as in Example 1.

| BREAK | 56.8 g |
|---|---|
| ELONGATION | 53.5% |
| RETAINED STRENGTH | 75.1% |
| RETAINED ELONGATION | 73.6% |

EXAMPLE 10

A fiber as in Example 9 was immersed in a solution of 100 g/l melamine resin and 20 g/l catalyst. The pick-up was 50%. The fiber was dried and cured at 330° F. for 90 seconds.

The treated fiber was tested after immersion in hydrogen peroxide solution as in Example 1.

| BREAK | 71.6 g |
|---|---|
| ELONGATION | 65.6% |
| RETAINED STRENGTH | 94.7% |
| RETAINED ELONGATION | 90.3% |

The treated fiber was tested after immersion in sodium hypochlorite solution as in Example 1.

| BREAK | 62.5 g |
|---|---|
| ELONGATION | 52.2% |
| RETAINED STRENGTH | 82.6% |
| RETAINED ELONGATION | 71.9% |

EXAMPLE 11

A fiber as in Example 9 was immersed in a bath containing 70 g/l melamine resin, 20 g/l catalyst, 25 g/l fluorochemical and 50 g/l organosiloxane. It was dried and cured at 350° F. for 90 seconds.

The treated fiber was tested after immersion in hydrogen peroxide solution as in Example 1.

| BREAK | 75 g |
|---|---|
| ELONGATION | 82% |
| RETAINED STRENGTH | 99.2% |
| RETAINED ELONGATION | 112.9% |

The treated fiber was tested after immersion in sodium hypochlorite solution as in Example 1.

| BREAK | 65.6 g |
|---|---|
| ELONGATION | 51.1% |
| RETAINED STRENGTH | 86.7% |
| RETAINED ELONGATION | 70.4% |

EXAMPLE 12

A fiber as in Example 9 was immersed in a bath containing three acid dyestuffs, 100 g/l melamine resin, and 20 g/l catalyst. Pick-up was 50%. The fiber was dried and then cured at 330° F. for 90 seconds. The treated fiber was tested after immersion in hydrogen peroxide solution as in Example 1.

| BREAK | 74.9 g |
|---|---|
| ELONGATION | 81.1% |
| RETAINED STRENGTH | 99.1% |
| RETAINED ELONGATION | 111.7% |

The treated fiber was tested after immersion in sodium hypochlorite solution as in Example 1.

| BREAK | 61 g |
|---|---|
| ELONGATION | 45.2% |
| RETAINED STRENGTH | 80.6% |
| RETAINED ELONGATION | 62.2% |

EXAMPLE 13

A fiber as in Example 9 was immersed in a solution of acid dyes as in Example 3. It was then dried and immersed in a bath containing 100 g/l melamine resin, 20 g/l catalyst and 50 g/l organosiloxane. It was dried and then cured at 330° F. for 90 seconds. The treated fiber was tested after immersion in hydrogen peroxide solution as in Example 1.

| BREAK | 72.8 g |
|---|---|
| ELONGATION | 95.4% |
| RETAINED STRENGTH | 96.2% |
| RETAINED ELONGATION | 131.4% |

The treated fiber was tested after immersion in sodium hypochlorite solution as in Example 1.

| BREAK | 69.4 g |
|---|---|
| ELONGATION | 70.7% |
| RETAINED STRENGTH | 91.7% |
| RETAINED ELONGATION | 97.3% |

EXAMPLE 14

A fourth sample of 15 denier fiber of Nylon 6 having a break point of 86 g and an elongation of 68% was tested after immersion in hydrogen peroxide solution as in Example 1.

| BREAK | 78 g |
|---|---|
| ELONGATION | 69% |
| RETAINED STRENGTH | 90.6% |
| RETAINED ELONGATION | 101.4% |

The same fiber was tested after immersion in sodium hypochlorite solution as in Example 1.

| BREAK | 52 g |
|---|---|
| ELONGATION | 34% |
| RETAINED STRENGTH | 60.4% |
| RETAINED ELONGATION | 50% |

EXAMPLE 15

A fiber as in Example 14 was immersed in a bath containing 100 g/l melamine resin, 20 g/l catalyst, 35 g/l fluorochemicals and 50 g/l organosiloxane. The pick-up was 50%. The fiber was dried and cured. The treated fiber was tested after immersion in hydrogen peroxide solution as in Example 1.

| BREAK | 76 g |
|---|---|
| ELONGATION | 81% |
| RETAINED STRENGTH | 82.3% |
| RETAINED ELONGATION | 119.1% |

The treated fiber was tested after immersion in sodium hypochlorite solution as in Example 1.

| BREAK | 62 g |
|---|---|
| ELONGATION | 50% |
| RETAINED STRENGTH | 72% |
| RETAINED ELONGATION | 73.5% |

EXAMPLE 16

A fiber as in Example 14 was immersed in a solution containing three acid dyes as in Example 3 at pH 4. The pick-up was 50%. The fiber was dried. The treated fiber was tested after immersion in hydrogen peroxide solution as in Example 1.

| BREAK | 79.3 g |
|---|---|
| ELONGATION | 68% |
| RETAINED STRENGTH | 92.2% |
| RETAINED ELONGATION | 100% |

The treated fiber was tested after immersion in sodium hypochlorite solution as in Example 1.

| BREAK | 45 g |
|---|---|
| ELONGATION | 34% |
| RETAINED STRENGTH | 52.3% |
| RETAINED ELONGATION | 50% |

EXAMPLE 17

A fiber as in Example 14 was treated with three acid dyes as in Example 16. It was then dried and immersed in a bath containing 100 g/l melamine resin, 20 g/l catalyst, 25 g/l fluorochemicals and 50 g/l organosiloxane. The treated fiber was tested after immersion in hydrogen peroxide solution as in Example 1.

| BREAK | 81.2 g |
|---|---|
| ELONGATION | 88% |
| RETAINED STRENGTH | 94.4%. |
| RETAINED ELONGATION | 129.4% |

The treated fiber was tested after immersion in sodium hypochlorite solution as in Example 1.

| BREAK | 72 g |
|---|---|
| ELONGATION | 65% |
| RETAINED STRENGTH | 83.7% |
| RETAINED ELONGATION | 95.5% |

EXAMPLE 18

A polyester filament is treated in a bath as in Example 15. The fiber is dried and cured. It is tested after immersion in hydrogen peroxide solution and sodium hypochlorite solution as in Example 1, with good results.

It was observed from the tests that treating the nylon fiber with chlororesorcinol, sulfonated novolak resin or sulfonated resol resin, or combinations of these three products, or with the three acid dyes, did not give satisfactory results. It was also observed that treatment with melamine resin alone or with the addition of fluorochemicals increased the stiffness of the fibers, did not give optimum resistance to oxidizing agent, and also created some degree of water repellency on the nylon felt. The polyamide and polyester fibers treated with the compositions claimed herein had good resistance to hydrogen peroxide and sodium hypochlorite and were soft and elastic.

Carrier supports or felts treated with the composition of the invention still have a useful working life even after 180 days continuous operation, a marked improvement over the maximum of 40 days achieved in the prior art.

I claim:

1. A method of increasing the resistance of a polyamide fiber or polyester fiber porous, self-supporting carrier sheet to oxidizing agents comprising the steps of:
   (a) preparing a composition comprising:
      (i) an organosiloxane modified with amino groups;
      (ii) a melamine formaldehyde resin;
      (iii) a catalyst for complexing said melamine formaldehyde resin; and
      (iv) water;
   (b) applying said composition to said carrier sheet; and
   (c) drying and curing said composition on the fibers of said carrier sheet.

2. A method according to claim 1, wherein said fibers are polyamide fibers, and wherein said composition further comprises the acid dyes Acid Yellow, Acid Red and Acid Blue.

3. A method according to claim 1, wherein said composition further comprises a fluorine-containing carbon-based polymer.

4. A method according to claim 3, wherein said composition is applied by immersing said carrier sheet in a bath of said composition.

5. A method according to claim 3, wherein said fibers absorb between 30–200% of their weight of said composition in step (b).

6. A method of increasing the resistance of polyamide fibers in a porous, self-supporting carrier sheet to oxidizing agents comprising the steps of:
   (a) preparing a composition comprising the acid dyes Acid Yellow, Acid Red and Acid Blue;
   (b) applying said composition to said fibers;
   (c) drying said fibers from (b);
   (d) preparing a composition comprising:
      (i) an organosiloxane modified with amino groups;
      (ii) a melamine formaldehyde resin;
      (iii) a catalyst for complexing said melamine formaldehyde resin; and
      (iv) water;
   (e) applying said composition of step (d) to said fibers of said carrier sheet;
   (f) drying and curing said composition on said fibers.

* * * * *